United States Patent [19]

Covington, Jr. et al.

[11] 4,428,852
[45] Jan. 31, 1984

[54] CONTINUOUS SYNTHESIS OF CHROMIUM DIOXIDE

[75] Inventors: Robert A. Covington, Jr.; Cecil L. Long, both of Wilmington; David W. Williston, Newark, all of Del.

[73] Assignee: E. I. Du Pont de Nemours and Company, Wilmington, Del.

[21] Appl. No.: 340,302

[22] Filed: Jan. 18, 1982

[51] Int. Cl.³ .......................................... C01G 37/027
[52] U.S. Cl. .............................. 252/62.56; 252/62.51; 422/232; 423/607
[58] Field of Search ..................... 252/62.51, 62.56; 423/607; 422/232

[56] References Cited

U.S. PATENT DOCUMENTS

| | | | |
|---|---|---|---|
| 1,379,187 | 5/1921 | Kaufman | 423/232 X |
| 2,021,991 | 11/1935 | Depew | 422/232 X |
| 3,010,802 | 11/1961 | Schenk | 422/232 X |
| 3,111,394 | 11/1963 | Weber et al. | 422/232 X |
| 3,278,263 | 10/1966 | Cox | 423/607 |
| 3,991,153 | 11/1976 | Klausner et al. | 264/211 |
| 4,045,544 | 8/1977 | Williston et al. | 252/62.51 |

Primary Examiner—Jack Cooper

[57] ABSTRACT

Ferromagnetic chromium dioxide is produced in a continuous operation by feeding a preheated paste of hydrated chromium oxides and additives into a twin screw reactor, reacting at elevated temperature and pressure for a short time while venting oxygen and steam, injecting water near the end of the reaction zone to form a viscous chromium dioxide-water mixture, and cooling while passing through a pressure letdown extruder.

8 Claims, 3 Drawing Figures

CONTINUOUS SYNTHESIS OF CHROMIUM DIOXIDE

FIELD OF INVENTION

This invention is directed to an improvement in the process of manufacturing ferromagnetic chromium dioxide.

BACKGROUND OF THE INVENTION

It is well known in the art that ferromagnetic chromium dioxide possesses many desirable characteristics which make it useful for certain applications in the manufacture of magnetic recording tapes, magnetic memory recorders, computers and other applications. The preparation of ferromagnetic chromium dioxide is described in U.S. Pat. Nos. 2,956,955; 3,117,093; and 3,278,263 (Cox), among others.

The Cox patent discloses a batch process for the manufacture of ferromagnetic chromium dioxide through thermal decomposition of a chromium (III) compound combined with oxygen, or a hydrated form thereof; with modifying agents including antimony compounds and iron compounds. The process is carried out in an oxidizing environment using a paste with a water content of from 5 to 30%, pressures of 50 to 3000 atmospheres and temperature of 250° to 500° C. One disadvantage of this process is that the synthesis is a lengthy batch process, in which the ferromagnetic chromium oxide product forms as a solid block which is fused to the interior of the reaction vessel. This block must be mechanically drilled out in order to recover the product. There is need for a continuous process of synthesizing ferromagnetic chromium oxide, in place of the batch process and its attendant problems.

BRIEF SUMMARY OF THE INVENTION

The subject process comprises continuously feeding a viscous paste comprising $CrO_3$, $Cr_2O_3$, water, and other additives, through an extruder screw while preheating to just below the incipient reaction temperature, and pressurizing to reaction pressure, continuously advancing the ingredient paste through an intermeshing twin screw reactor; progressively increasing reactor temperature to a temperature such that the $CrO_3$, $Cr_2O_3$ and $H_2O$ will react, preferably a temperature above 174° C. so that the reaction will occur in less than 60 minutes to produce $CrO_2$ crystals suitable for magnetic recordings; and continuously venting off byproduct oxygen, gas and steam to maintain a reaction pressure above 750 psig. Water is continuously injected at high pressure into an intermediate portion of the reactor to form a viscous $CrO_2$-water slurry, which is cooled while passing through a pressure letdown extruder and control valve. Advantages are better product quality and uniformity, lower mill cost, and improved safety by eliminating can handling and dust exposure.

In a preferred embodiment, the process is a continuous chromium dioxide synthesis process which consists essentially of the steps of feeding, while preheating, an ingredient paste mixture comprising $CrO_3$, $Cr_2O_3$, and $H_2O$ at elevated pressure to a reaction zone in the form of a twin-screw reactor, advancing the paste mixture in a starved (nonflooded) mode through the reactor, at elevated temperatures and pressures, the residence time being sufficient for the paste ingredients to react to form $CrO_2$, continuously venting byproduct oxygen and steam, thereafter injecting water at high pressures into the reaction product to form a viscous $CrO_2$—$H_2O$ slurry, and discharging the slurry from the reactor into a separate pressure letdown zone, wherein the slurry is cooled and depressurized to atmospheric pressure.

DETAILED DESCRIPTION OF THE INVENTION

The invention is illustrated by the drawings.

Throughout the description, similar reference numerals refer to similar elements in the drawings.

Figure 1:
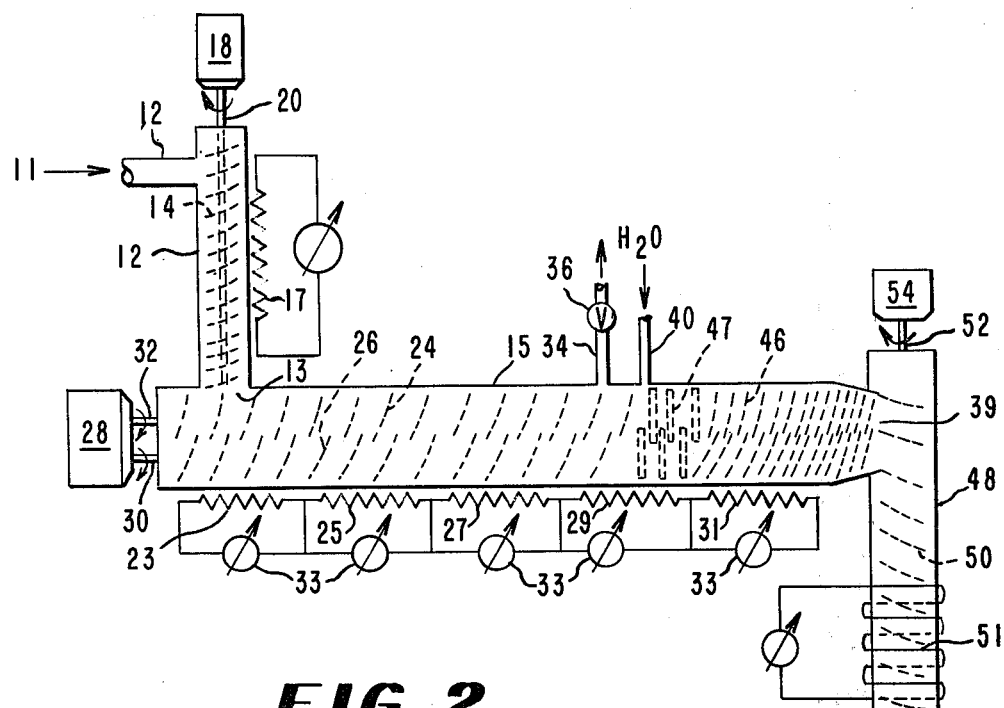
FIG. 1 is a schematic illustration of an apparatus for the continuous production of $CrO_2$ in accordance with the present invention.

With reference to FIG. 1 an apparatus for the continuous synthesis of $CrO_2$ is depicted in which a feeding extruder 12 having a single screw 14 driven by motor 18 through a shaft 20 is used to introduce ingredients to be reacted into the main reactor 15. Feeding extruder 12 serves as a vessel in which to preheat the ingredients and pressurize them to reaction pressure. In operation, these ingredients are in the form of a paste comprising $CrO_3$, $Cr_2O_3$, and water, as well as minor amounts of $Sb_2O_3$ and $Fe_2O_3$, with other conventional additives and is introduced to feeding extruder 11 through conduit 16.

Preheating in the feeding extruder 12 is achieved through a heating system 17 which increases the temperature of the paste material from essentially ambient room temperature to just below the reaction temperature, which in the preferred embodiment is about 250° C.

The main reactor 15 comprises a twin screw extruder having two co-rotating intermeshed, fully wiped screws 24 and 26 preferably of two lobe design driven through shafts 30 and 32 by motor 28. The pitch of the screws is such that in the early portion of the reactor the pitch is greater than that in the later portion. Inlet 13 is provided for the introduction of the ingredients from feeding extruder 12. Additionally, there is provided a vent 34 having a control valve 36 for the venting of reaction byproducts, and a water injection port 40.

A number of individually controlled heating elements 23, 25, 27, 29 and 31 are provided along the length of the reactor vessel 15 to control the temperature of the materials during reaction. In FIG. 1 five such temperature control zones are indicated, however, more or fewer zones may be used. These heating elements have controllers 33 with which the temperature in the reactor may be adjusted within a range from the incipient reaction temperature to a temperature sufficient to complete the reaction to form $CrO_2$. Such temperatures may vary from below 300° C. to 400° C. From the point where the paste is introduced into the main reactor 15 until the point at which water is introduced into the vessel, the pitch of the twin screw is such as to maintain a "starved" zone, meaning that the space between screw flights is not completely filled with paste or reacted materials. Starved flow is used to prevent compaction of the reacted material, which would otherwise form a hard substance and stop the flow. The length of this section of the extruder determines the residence time of the paste for reaction to form $CrO_2$.

Just prior to the point at which water is injected into the reaction vessel, venting means 34 allow reaction byproducts in the form of oxygen and water vapor to be continuously vented to the atmosphere in a controlled manner through valve 36. This is needed to maintain reaction pressure in the preferred range, i.e., between about 2000 and 6000 psi.

Just prior to the point where the pitch of the extruder screw changes, at which point the reaction of the paste ingredients is essentially complete, injection port 40 is provided for the introduction of water. The presence of water in the mixture of water and $CrO_2$ is extremely critical in order to control viscosity, therefore, a positive displacement piston pump (not shown) is preferably used to inject carefully metered amounts of water under high pressure at controlled rates. In addition, viscosity is shear rate sensitive and control is obtained through adjustment of the rotational speed of the screw of the letdown extruder 48. Close viscosity control is needed to maintain the pressure drop through the letdown extruder 48. Immediately following the injection of water, mixing elements 47 are provided as part of the reactor screws to mix the reacted material and water to form a flowable viscous slurry. Following mixing elements 47, the pitch of the twin screw reactor blades is decreased to provide a compacting action and flood the discharge section 46 of the twin screw extruder. The slurry is then discharged through opening 39 into a pressure letdown extruder 48 for depressurizing. To aid in controlling the viscosity of the reacted $CrO_2$ and water mixture, it is desirable to connect in parallel with the main injection pump a second small positive displacement pump, not shown in this drawing.

Pressure letdown extruder 48 comprises a single screw 50 driven through a motor 54 and a shaft 52. Preferably, the pressure letdown extruder terminates at valve 56, which controls the discharge 58 of the viscous mixture of water and finished product, and may be further equipped with a cooling system 51 to reduce the temperature of the viscous slurry prior to discharge.

The pressure letdown extruder 48 is needed to bring the reaction material from the very high reaction pressure (2000 to 6000 psi) to atmospheric in a continuous operation. This requires maintaining a flooded condition throughout the length of the letdown extruder. The pressure letdown extruder screw 50 is designed so as to produce a high degree of flow resistance per unit length, by the use of very shallow flights, short screw pitch and tight clearances between the tips of the flight and the inside surface of the extruder barrel. In addition, the extruder is designed with a very high length-to-diameter ratio which acts to increase the path length of the material prior to discharge. These features of the extruder structure generate sufficient resistance to flow to maintain a pressure seal from the high reaction pressure to atmospheric through the letdown extruder. During the letdown process, the material is further cooled from reaction temperature to essentially room temperature.

Figure 2:
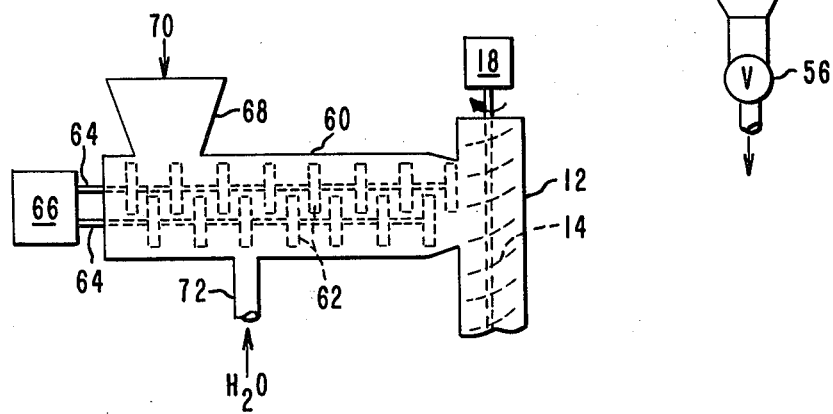
FIG. 2 illustrates an alternate embodiment for continuous mixing of ingredients prior to injecting them into the apparatus of FIG. 1.
Figure 2A:
FIG. 2A is a front view of the mixing blades of the mixer of FIG. 2.

In FIG. 2 there is depicted an alternate feeding embodiment as an integral part of the reactor, which allows continuously mixing the ingredients to make an ingredient paste. An elongated mixing vessel 60 is connected to the feeding extruder 12 at the point where the paste 11 was previously injected thereto. Mixing vessel 60 houses a twin element mixer, the mixing blades 62 of which (see FIG. 2A for front view) serve to mix the ingredients 70 fed to vessel 60 through funnel opening 68. Ingredients 70 are the metal oxides needed for the reaction to form ferromagnetic $CrO_2$, typically a dry mixture of $Cr_2O_3$, $CrO_3$, $Sb_2O_3$, and $Fe_2O_3$.

A motor 66 and shafts 64 serve to drive mixing blades 62. At a point adjacent the entry point of ingredients 70 there is located an injection port 72 through which water is injected to mix with the dry ingredients and form a paste. To obtain the necessary composition with accuracy, precision gravimetric feeders (not shown) are used for feeding the solid components. Similarly, an accurate metering pump (also not shown) is used to inject the water. The remainder of the operation remains the same as previously described above.

Figure 3:
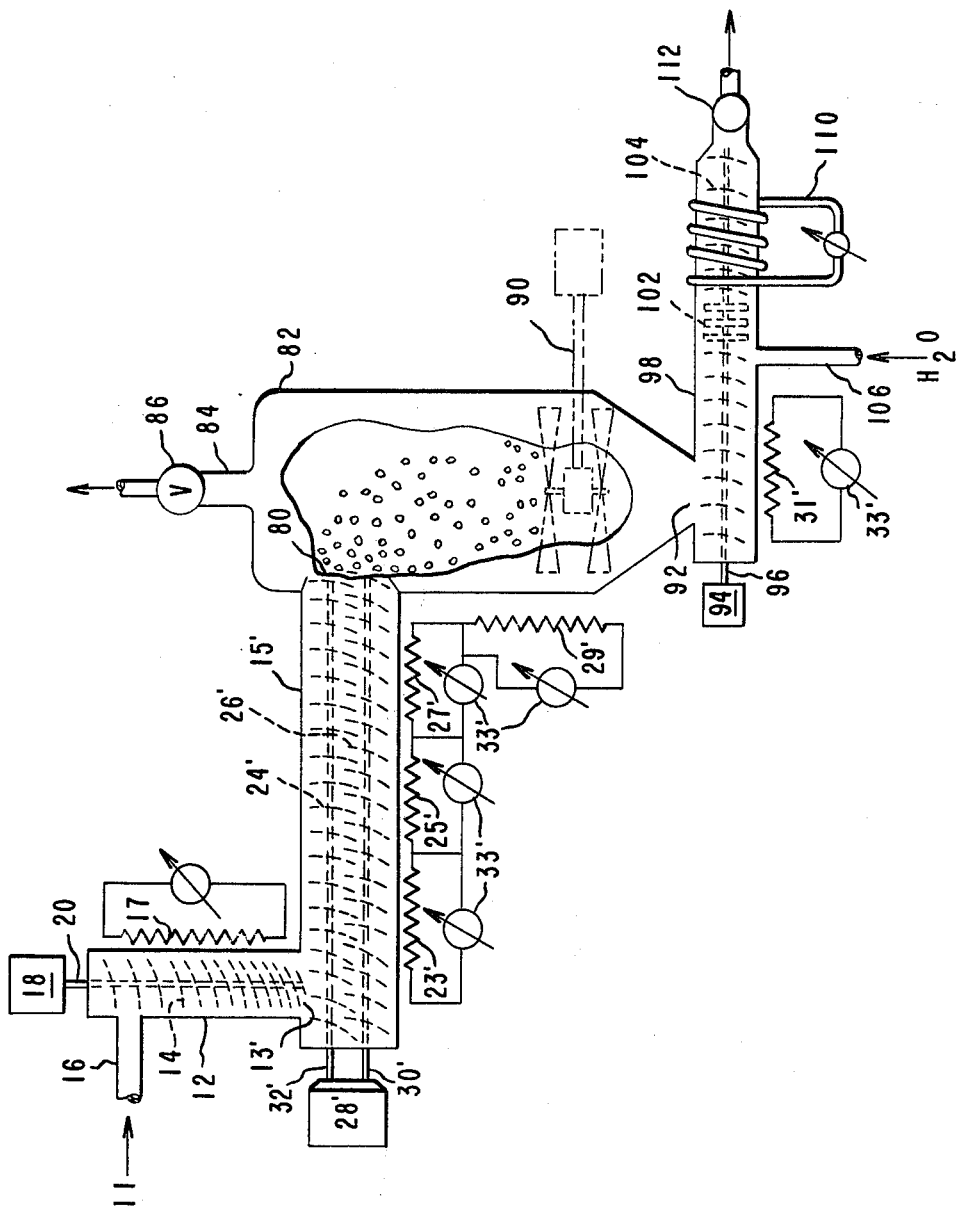
FIG. 3 illustrates an alternate embodiment of the invention, incorporating a holding tank to reduce the size of the reactor vessel shown in FIG. 1.

The alternate concept shown in FIG. 3 utilizes the same feed arrangement as that indicated in FIG. 1 comprising a feeding extruder 12 having an inlet 16 through which a paste 11 of the desired ingredients is introduced, a motor drive 18, and a shaft 20 driving a single screw 14 for injecting the paste into the reaction vessel 15' through opening 13'. Preheating is again provided through a heating system 17 to heat the ingredients prior to the reaction.

In this embodiment, the reaction occurs in two different reaction vessels, 15' and 82, rather than the single reaction vessel depicted in FIG. 1. This permits the reaction time to be increased without the need for an unduly long twin screw extruder. The first portion of the reactor vessel 15' is identical to that of reactor 15 shown in FIG. 1 up to the point at which oxygen and vapor are vented through vent 34. Up to this point reactor 15' comprises an extruder having co-rotating, intermeshing, fully wiped twin screws depicted by numerals 24' and 26' driven through two shafts 30' and 32' powered through motor 28', and heated by heating elements 23', 25', 27', each equipped with a controller 33'. The output of this twin screw extruder is directed through opening 80 to holding tank 82 which is analogous to reactor 15' in that it is a high temperature, high pressure vessel. Both reactor 15' and tank 82 are maintained at essentially the same high pressure and temperature. Holding tank 82 is heated by heating element 29', and is equipped with vent 84 through which reaction byproducts such as oxygen and steam are vented via a control valve 86. Optionally, holding tank 82 may be equipped with a stirring device, generally depicted by numeral 90, to provide for the agitation of the reaction ingredients during the residence time in the tank. The holding tank terminates in opening 92 which discharges into a combination reaction and pressure letdown extruder 98.

Extruder 98 differs from the pressure letdown extruder shown in FIG. 1. It comprises two sections, a dry feed section which receives the material from the holding vessel 82, and a mixing and letdown section. An injection port 106 is provided at the end of the dry section through which water is injected. Following the point of water injection, a mixing section comprising mixing elements 102 is provided to thoroughly mix the dry reactive product with the injected water. Following mixing section 102 the pitch of the extruder screw is decreased to flood the remainder section 104 of the extruder and provide a plug seal for the eventual discharge of the product under atmospheric pressure. Valve 112 may be used to control this discharge and to release the product to a receiving container not indicated in this drawing. Extruder 98 further includes a motor drive 94 which operates the extruder screw through shaft 96. Heating means 31', with controller 33', are also provided in the dry section of this extruder. Additionally, cooling means 110 are provided in the flooded section 104 of the extruder to reduce the temperature of the reacted material prior to discharge.

Reaction temperature and pressure is maintained in the early section of the extruder and reacted product is advanced in a starved mode until the point where water is introduced to again produce the slurry necessary for the letdown process which occurs in the latter section of this extruder. As previously described, cooling means 110 are provided for this latter section of the letdown extruder to bring the reacted material temperature close to room temperature at the discharge point.

The continuous synthesis process of this invention is designed to operate continuously at a pressure of up to 6000 psi and temperatures in excess of 350° C. in a highly corrosive oxygen and chromic acid environment, with oxygen being a byproduct. Hence the equipment must withstand such conditions, but also it must resist the abrasive action of the $CrO_2$ product particles. Therefore, the selection of materials of construction, especially for the twin screw extruder, must be made with the above in mind.

In addition to poor wear resistance, alloys containing nickel, molybdenum, aluminum or copper must be avoided as these elements tend to contaminate and lower the magnetic properties of the $CrO_2$. On the other hand, platinum, titanium, tantalum and iron are safe to use in the process. The following show good corrosion and abrasion resistance: Fe-14% Si, Ta-10%W (tungsten) alloys.

In a typical example, using apparatus substantially as depicted in FIG. 1, but with the feeding extruder 12 replaced by two cyclically operated piston pumps and a preheat vessel, a paste comprising a major amount of $CrO_3/Cr_2O_3/H_2O$, and small amounts of $SbO_3$ and $Fe_2O_3$ was fed to a twin screw reactor extruder at the rate of 17 g/min at a temperature of 260° C. and a pressure of 4350 psi. The paste was advanced through the reactor with a residence time of about 12 min at 4300 psi(gas pressure). There were five reactor temperature zones, at 260° C., 323° C., 343° C., 347° C. and 345° C. Discharge pressure in the flooded final zone was 4400 psi. Water was injected into the reactor at 3 g/min. The reacted material was then discharged into the pressure letdown extruder, which was cooled using a water jacket. The pressure profile of this extruder was 4000 psi at the entry, decreasing to 1000 psi just before the valve releasing it to the atmosphere. Reaction product, mixed with water was discharged at the rate of 19 g/min and the magnetic properties prior to thermal upgrading were measured as coercivity (iHc)=510 oersteds, saturation magnetization $(\sigma_s)$=65.4 emu/gm and remanent magnetization $(\sigma_r)$=31.6 emu/gm. When the product was thermally upgraded (heated 1 hr at 325° C. in an oxidizing environment, as described in U.S. Pat. No. 3,529,930) the corresponding values were 505, 71, and 34. Prior to startup, the letdown extruder was preloaded with a slurry of previously reacted material to provide a plug for the twin screw extruder.

Those skilled in the art, having the benefits of the teachings of the instant invention as hereinabove set forth, may effect numerous modifications thereto. Since this is a high pressure system, the practitioner may add relief valves and monitoring equipment both to insure the safety of the operation and to monitor the progress of the reaction. Materials other than the ones referred to above may be used, including ceramics or ceramic clad metals to provide higher resistance to the corrosive and abrasive environment of this reaction.

What is claimed is:

1. A continuous chromium dioxide synthesis process which consists essentially of the steps of feeding through an extruder screw, while preheating, to just below the temperature at which incipient reaction occurs a viscous paste mixture comprising $CrO_3$ $Cr_2O_3$ and $H_2O$ at elevated pressure to a reaction zone in the form of a twin-screw reactor, advancing the paste mixture in a starved (nonflooded) mode through the reactor, at elevated temperatures and pressures, the residence time being sufficient for the paste mixture to react to form $CrO_2$, continuously venting byproduct oxygen and steam, thereafter injecting water at high pressures into the reaction product to form a viscous $CrO_2$—$H_2O$ slurry, and discharging the slurry from the reactor into a separate pressure letdown zone, wherein the slurry is cooled and depressurized to atmospheric pressure.

2. Process of claim 1 wherein the viscous paste mixture comprises a major amount of $CrO_3$, $Cr_2O_3$ and $H_2O$ and minor amounts of $Sb_2O_3$ and $Fe_2O_3$.

3. Process of claim 1 wherein the paste mixture is heated to a temperature of about 250° C. in the preheating step.

4. Process of claim 1 wherein the twin screw reactor is horizontally elongated, and the pressure letdown zone comprises an elongated vessel with its axis perpendicular to the axis of the twin screw reactor, the inlet portion of which opens into said twin screw reactor and the exit portion of which opens to the atmosphere.

5. Process of claim 1 wherein the pitch of the twin screw reactor is decreased in a portion of the reactor between the point of water injection and the pressure letdown zone, whereby the product is discharged from the reaction zone in a flooded condition.

6. Process of claim 1 wherein the pressure in the reaction, zone is 2000-6000 psi.

7. A continuous chromium dioxide synthesis process which comprises continuously mixing a viscous paste comprising $CrO_3$, $Cr_2O_3$ and $H_2O$ in a mixing zone; continuously feeding the paste through an extruder screw to a first reaction zone in the form of an intermeshing, twin-screw reactor, while preheating to just below the reaction temperature and pressurizing to reaction pressure; continuously advancing the viscous paste through said reaction zone in a starved mode for a time sufficient for the $CrO_3$, $Cr_2O_3$ and $H_2O$ to partially react, continuously venting byproduct oxygen and steam; discharging the contents of the first reaction zone into a second reaction zone; holding the contents therein at a temperature and pressure analogous to that in the first reaction zone; venting byproduct oxygen and steam; thereafter passing the contents of the second reaction zone into a separate reaction and pressure letdown extruder; advancing said contents in a starved mode in the first section of the extruder while maintaining the reaction temperature and pressure; thereafter injecting water at high pressures into the reaction product in said extruder to form a viscous $CrO_2$—$H_2O$ slurry and cooling and depressurizing the slurry to atmospheric pressure in the latter part of the extruder.

8. Process of claim 7 wherein the second reaction zone is in the form of a holding tank, and the contents of said holding tank are agitated to prevent agglomeration.

* * * * *